United States Patent [19]

Deaner et al.

[11] Patent Number: 5,441,801
[45] Date of Patent: Aug. 15, 1995

[54] ADVANCED POLYMER/WOOD COMPOSITE PELLET PROCESS

[75] Inventors: Michael J. Deaner, Osceola, Wis.; Giuseppe Puppin, Bayport; Kurt E. Heikkila, Circle Pines, both of Minn.

[73] Assignee: Andersen Corporation, Bayport, Minn.

[21] Appl. No.: 17,240

[22] Filed: Feb. 12, 1993

[51] Int. Cl.$^6$ .................... B32B 23/00; B32B 23/08
[52] U.S. Cl. .................... 428/326; 428/359; 428/361; 428/378; 428/393; 428/425.1; 428/479.3; 428/479.6; 428/507
[58] Field of Search ............ 428/259, 361, 375, 378, 428/393, 402, 326; 524/13, 16

[56] References Cited

U.S. PATENT DOCUMENTS

| | | | |
|---|---|---|---|
| 2,188,396 | 1/1940 | Semon | 18/55 |
| 2,489,373 | 11/1945 | Gilman | 260/37 |
| 2,519,442 | 8/1950 | Delorme et al. | 260/17.4 |
| 2,558,378 | 6/1951 | Petry | 260/41 |
| 2,635,976 | 4/1953 | Meiler et al. | 154/132 |
| 2,680,102 | 6/1954 | Becher | 260/17.3 |
| 2,789,903 | 4/1957 | Lukman et al. | 92/21 |
| 2,926,729 | 3/1960 | Zanini | 160/236 |
| 2,935,763 | 5/1960 | Newman et al. | 18/55 |
| 3,287,480 | 11/1966 | Wechsler et al. | 264/122 |
| 3,308,218 | 3/1967 | Wiegand et al. | 264/121 |
| 3,309,444 | 3/1967 | Schueler | 264/109 |
| 3,349,538 | 10/1967 | Crossman | 52/731 |
| 3,432,885 | 3/1969 | Zanini | 18/13 |
| 3,492,388 | 1/1970 | Inglin-Knosel | 264/129 |
| 3,493,527 | 2/1970 | Schueler | 260/17.2 |
| 3,562,373 | 2/1971 | Logrippo | 264/118 |
| 3,645,939 | 2/1972 | Gaylord | 260/17.4 |
| 3,671,615 | 6/1972 | Price | 264/39 |
| 3,833,325 | 9/1974 | Ramsey | 425/113 |
| 3,878,143 | 4/1975 | Baumann et al. | 260/17.4 |
| 3,888,810 | 6/1975 | Shinomura | 260/17.4 |
| 3,899,559 | 8/1975 | Johnanson et al. | 264/115 |
| 3,904,726 | 9/1975 | Jacquelin et al. | 264/117 |
| 3,931,384 | 1/1976 | Forquer et al. | 264/120 |
| 3,943,079 | 3/1976 | Hamed | 524/13 |
| 3,956,541 | 5/1976 | Pringle | 428/2 |
| 3,956,555 | 5/1976 | McKean | 428/106 |
| 3,969,459 | 7/1976 | Fremont et al. | 264/109 |
| 4,005,162 | 1/1977 | Bucking | 264/25 |
| 4,012,348 | 3/1977 | Chelland et al. | 260/28.5 |
| 4,016,232 | 4/1977 | Pringle | 264/112 |
| 4,018,722 | 4/1977 | Baker | 260/2.3 |
| 4,033,913 | 7/1977 | Sunden | 260/17 |
| 4,045,603 | 8/1977 | Smith | 428/2 |
| 4,056,591 | 11/1977 | Goettler et al. | 264/108 |
| 4,058,580 | 11/1977 | Flanders | 264/113 |
| 4,071,479 | 1/1978 | Broyde et al. | 260/2.3 |
| 4,097,648 | 6/1978 | Pringle | 428/326 |
| 4,102,106 | 7/1978 | Golder et al. | 52/533 |
| 4,115,497 | 9/1978 | Halmo | 264/115 |
| 4,145,389 | 3/1979 | Smith | 264/40.7 |
| 4,168,251 | 9/1979 | Schinzel et al. | 260/17.4 |
| 4,181,764 | 1/1980 | Totten | 428/155 |
| 4,187,352 | 2/1980 | Klobbie | 521/79 |
| 4,203,876 | 5/1980 | Dereppe et al. | 260/17.4 |

(List continued on next page.)

FOREIGN PATENT DOCUMENTS 07022 10/1991 European Pat. Off. ............ 524/13

(List continued on next page.)

OTHER PUBLICATIONS

Database WPI, Week 8442, Derwent Publications Ltd., London, GB; AN 84-259377 & JP-A-59 156 172 (Ain Eng.), 6 Sep. 1984.

(List continued on next page.)

Primary Examiner—Patrick J. Ryan
Assistant Examiner—Jill M. Gray
Attorney, Agent, or Firm—Merchant, Gould, Smith, Edell, Welter & Schmidt

[57] ABSTRACT

A process for making a polyvinyl chloride and wood composite pellet by extrusion. The polyvinyl chloride and wood fiber are introduced into the extruder at a ratio of approximately 6:4 by weight, respectively. The polyvinyl chloride is melted and blended with the wood fiber so that the interstitial voids of the wood fiber are filled with polyvinyl chloride. After being extruded through a die, the molten material is cut into pellets having a bulk density of preferably between 0.7 to 0.8 gm/mm$^3$.

9 Claims, 1 Drawing Sheet

U.S. PATENT DOCUMENTS

| | | | |
|---|---|---|---|
| 4,228,116 | 10/1980 | Colombo et al. | 264/119 |
| 4,239,679 | 12/1980 | Rolls et al. | 260/42.49 |
| 4,244,903 | 1/1981 | Schnause | 264/68 |
| 4,248,743 | 2/1981 | Goettler | 260/17.4 |
| 4,248,820 | 2/1981 | Haataja | 264/113 |
| 4,250,222 | 2/1981 | Mavel et al. | 428/285 |
| 4,263,184 | 4/1981 | Leo et al. | 260/17.4 |
| 4,273,688 | 6/1981 | Porzel et al. | 260/17.4 |
| 4,277,428 | 7/1981 | Luck et al. | 264/118 |
| 4,281,039 | 7/1981 | Miura et al. | 428/159 |
| 4,290,988 | 9/1981 | Nopper et al. | 264/112 |
| 4,305,901 | 12/1981 | Prince et al. | 264/176 |
| 4,311,554 | 1/1982 | Herr | 162/159 |
| 4,311,621 | 1/1982 | Nishizawa et al. | 260/17.2 |
| 4,323,625 | 4/1982 | Coran et al. | 428/361 |
| 4,328,136 | 5/1982 | Blount | 523/204 |
| 4,376,144 | 3/1983 | Goettler | 428/36 |
| 4,382,108 | 5/1983 | Carroll et al. | 428/326 |
| 4,393,020 | 7/1983 | Li et al. | 264/108 |
| 4,414,267 | 11/1983 | Coran et al. | 428/288 |
| 4,420,351 | 12/1983 | Lussi et al. | 156/62.4 |
| 4,426,470 | 1/1984 | Wessling et al. | 524/35 |
| 4,440,708 | 4/1984 | Haataja et al. | 264/109 |
| 4,454,091 | 6/1984 | Chion et al. | 264/171 |
| 4,455,709 | 6/1984 | Zanini | 16/90 |
| 4,481,701 | 11/1984 | Hewitt | 29/416 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gasland | 162/158 |
| 4,551,294 | 11/1985 | Wottka et al. | 264/175 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,663,225 | 5/1987 | Farley et al. | 428/290 |
| 4,686,251 | 8/1987 | Ostermann et al. | 523/448 |
| 4,687,793 | 8/1987 | Motegi et al. | 523/200 |
| 4,716,062 | 12/1987 | Klein | 428/36 |
| 4,734,236 | 3/1988 | Davis | 264/112 |
| 4,737,532 | 4/1988 | Fujita et al. | 524/13 |
| 4,769,109 | 9/1988 | Tellvik et al. | 162/123 |
| 4,769,274 | 9/1988 | Tellvik et al. | 428/218 |
| 4,774,272 | 9/1988 | Lamphere et al. | 524/13 |
| 4,790,966 | 12/1988 | Sandberg et al. | 264/39 |
| 4,791,024 | 12/1988 | Kokta | 428/359 |
| 4,818,604 | 4/1989 | Tock | 428/319.9 |
| 4,820,763 | 4/1989 | Yang | 524/505 |
| 4,837,977 | 6/1989 | Mauro | 49/501 |
| 4,851,458 | 7/1989 | Hopperdietzel | 523/205 |
| 4,865,788 | 9/1989 | Davis | 264/112 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,579 | 5/1990 | Moore | 264/101 |
| 4,929,409 | 5/1990 | Agren et al. | 264/508 |
| 4,935,182 | 6/1990 | Ehner et al. | 264/112 |
| 4,960,548 | 10/1990 | Ikeda et al. | 264/40.4 |
| 4,968,463 | 11/1990 | Levasseur | 264/40.1 |
| 4,973,440 | 11/1990 | Tamura et al. | 264/114 |
| 4,978,489 | 12/1990 | Radvan et al. | 264/118 |
| 4,978,575 | 12/1990 | Ziess | 428/402 |
| 4,988,478 | 1/1991 | Held | 264/518 |
| 5,002,713 | 3/1991 | Palardy et al. | 264/109 |
| 5,008,310 | 4/1991 | Beshay | 524/13 |
| 5,009,586 | 4/1991 | Pallmann | 425/311 |
| 5,020,915 | 6/1991 | Julien | 366/89 |
| 5,021,490 | 6/1991 | Vyvoda et al. | 524/140 |
| 5,028,266 | 7/1991 | Rettenmaier | 428/378 |
| 5,049,334 | 9/1991 | Bach | 264/122 |
| 5,057,167 | 10/1991 | Gersbeck | 156/62.2 |
| 5,075,057 | 12/1991 | Hoedl | 264/115 |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,084,135 | 1/1992 | Brooks et al. | 162/4 |
| 5,087,400 | 2/1992 | Theuveny | 264/115 |
| 5,088,910 | 2/1992 | Goforth et al. | 425/142 |
| 5,093,058 | 3/1992 | Harmon et al. | 264/115 |
| 5,096,046 | 3/1992 | Goforth et al. | 198/604 |
| 5,096,406 | 3/1992 | Brooks et al. | 425/205 |
| 5,100,545 | 3/1992 | Brooks | 210/194 |
| 5,120,776 | 6/1992 | Raj et al. | 524/13 |
| 5,183,837 | 2/1993 | Lepori et al. | 524/13 |

FOREIGN PATENT DOCUMENTS

| | | |
|---|---|---|
| 2200112 | 4/1974 | France . |
| 2564374 | 11/1985 | France . |
| 2344101 | 1/1977 | Germany . |
| 2104903 | 3/1983 | United Kingdom . |
| 2171953 | 9/1986 | United Kingdom . |
| 2186655 | 8/1987 | United Kingdom . |

OTHER PUBLICATIONS

Database WPI, Week 8402, Derwent Publications Ltd., London, GB; AN 84-008707 & JP-A-58 204 049 (Ein Eng.), 28 Nov. 1983.

(List continued on next page.)

OTHER PUBLICATIONS

Database WPI, Week 84721 Derwent Publications Ltd., London, GB; AN 87-147663 & JP-A-61 086 042 (Chisso), 20 Apr. 1987.
Database WPI, Week 8652, Derwent Publications Ltd., London, GB; AN 86-341745 & JP-A-61 236 858 (Chisso), 22 Oct. 1986.
Kokta et al., "Use of Wood Fibers in Thermoplastic Composites", Polymer Composites, Oct. 1983, vol. 4, No. 4, pp. 229-232.
Yam et al., "Composites From Compounding Wood Fibers With Recycled High Density Polyethylene", Polymer Engineering and Science, Mid-Jun. 1990, vol. 30, No. 11, pp. 693-699.
Zadorecki et al., "Future Prospects for Wood Cellulose as Reinforcement in Organic Polymer Composites", Polymer Composites, Apr. 1989, vol. 10, No. 2, pp. 69-77.
Woodhams et al., "Wood Fibers as Reinforcing Fillers for Polyolefins", Polymer Engineering and Science, Oct. 1984, vol. 24, No. 15, pp. 1166-1171.
"Mechanical Properties of Wood", Revision by Bendtsen et al., pp. 4-2 through 4-44.
Maldas et al., "Composites of Polyvinyl Chloride--Wood Fibers: IV. Effect of the Nature of Fibers", Journal of Vinyl Technology, Jun. 1989, vol. 11, No. 2, pp. 90-98.
Raj et al., "Use of Wood Fibers as Filler in Common Thermoplastic Studies on Mechanical Properties", Science and Engineering of Composite Materials, vol. 1, No. 3, 1989, pp. 85-98.
Kokta et al., "Use of Grafted Wood Fibers in Thermoplastic Composites V. Polystyrene", pp. 90-96.
Klason et al., "The Efficiency of Cellulosic Fillers in Common Thermoplastics. Part I. Filling Without Processing Aids or Coupling Agents", International Journal of Polymeric Materials, Mar. 1984, pp. 159-187.
Dalvag et al., "The Efficiency of Cellulosic Fillers in Common Thermoplastics. Part II. Filling with Process Aids and Coupling Agents", International Journal of Polymeric Materials, 1985, vol. 11, pp. 9-38.
Rogalski et al., "Poly(Vinyl-Chloride) Wood Fiber Composites", Antec '87, pp. 1436-1441.
Raj et al., "Use of Wood Fibers in Thermoplastics. VII. The Effect of Coupling Agents in Polyethylene-Wood Fiber Composites", Journal of Applied Polymer Science, vol. 37, (1989), pp. 1089-1103.
Kokta et al., "Composites of Polyvinyl Chloride-Wood Fibers. I. Effect of Isocyanate as a Bonding Agent", Polym. Plast. Technol. Eng. 29(1&2), 1990, pp. 87-118.
Kokta et al., "Composites of Polyvinyl Chloride-Wood Fibers. III. Effect of Silane as Coupling Agent", Journal of Vinyl Technology, Sep. 1990, vol. 12, No. 3, pp. 146-153.
Kokta et al., "Composites of Poly(Vinyl Chloride) and Wood Fibers. Part II: Effect of Chemical Treatment", Polymer Composites, Apr. 1990, vol. 11, No. 2, pp. 84-89.
BFGoodrich, Geon Vinyl Division, Section One, FIBERLOC®, Polymer Composites, Engineering Design Data Sheet, pp. 2-15.
"A Complete Guide to Andersen Windows & Patio Doors", 1992 Product Catalog.

ADVANCED POLYMER/WOOD COMPOSITE PELLET PROCESS

FIELD OF THE INVENTION

The present invention pertains to an extrusion process for making an advanced polymer/wood composite pellet.

BACKGROUND OF THE INVENTION

Conventional window and door manufacture has commonly used wood and metal components in forming structural members. Residential windows are commonly manufactured from milled wood products that are assembled with glass to form double hung or casement units. Wood windows while structurally sound, useful and well adapted for use in many residential installations, can deteriorate under certain circumstances. Wood windows also require painting and other periodic maintenance. Wood windows also suffer from cost problems related to the availability of suitable wood for construction. Clear wood products are slowly becoming more scarce and are becoming more expensive as demand increases. Metal components are often combined with glass and formed into single unit sliding windows. Metal windows typically suffer from substantial energy loss during winter months.

Extruded thermoplastic materials have been used in window and door manufacture. Filled and unfilled thermoplastics have been extruded into useful seals, trim, weatherstripping, coatings, and other window construction components. Thermoplastic materials, such as polyvinyl chloride, have been combined with wood members in manufacturing PERMASHIELD ® brand windows manufactured by Andersen Corporation for many years. The technology disclosed in Zanini, U.S. Pat. Nos. 2,926,729 and 3,432,883, have been utilized in the manufacturing of plastic coatings or envelopes on wooden or other structural members. Generally, the cladding or coating technology used in making PERMASHIELD ® windows involves extruding a thin polyvinyl chloride coating or envelope surrounding a wooden structural member.

Polymer materials have combined with cellulosic fiber to make extruded materials. However, such materials have not successfully been used in the form of a structural member that is a direct replacement for wood. Common extruded thermoplastic composite materials cannot provide thermal and structural properties similar to wood or other structural materials. These extruded materials fail to have sufficient modulus, compressive strength, coefficient of thermal expansion that matches wood to produce a direct replacement material. Further, many prior art extruded composites must be milled after extrusion to a final useful shape. Typical commodity plastics have achieved a modulus no greater than about 500,000. One class of composite, a polyvinyl chloride/wood flour material, poses the added problem that wood dust, which can accumulate during manufacture, tends to be explosive at certain concentrations of wood flour in the air. Most commonly, polyvinyl chloride, polystyrene, and polyethylene thermoplastics have been used in such products.

Accordingly, a substantial need exists for a composite material that can be made of polymer and wood fiber with an optional, intentional recycle of a waste stream. A further need exists for a composite material that can be extruded into a shape that is a direct substitute for the equivalent milled shape in a wooden or metal structural member. This need requires a coefficient of thermal expansion that approximates wood, a material that can be extruded into reproducible stable dimensions, a high compressive strength, a low thermal transmission rate, an improved resistance to insect attack and rot while in use, and a hardness and rigidity that permits sawing, milling, and fastening retention comparable to wood members.

Further, companies manufacturing window and door products have become significantly sensitive to waste streams produced in the manufacture of such products. Substantial quantities of wood waste including wood trim pieces, sawdust, wood milling by-products, recycled thermoplastic including recycled polyvinyl chloride, have caused significant expense to window manufacturers. Commonly, these materials are either burned, for their heat value in electrical generation, or are shipped to qualified landfills for disposal. Such waste streams are contaminated with substantial proportions of hot melt and solvent-based adhesives, waste thermoplastic such as polyvinyl chloride, paint, preservatives, and other organic materials. A substantial need exists to find a productive, environmentally-compatible process for using such waste streams for useful structural members and, thus, to avoid returning the materials into the environment in an environmentally harmful way.

SUMMARY OF THE INVENTION

This invention pertains to a process of combining cellulosic fiber and thermoplastic polymer materials, for example, wood fiber and polyvinyl chloride to form a pellet of composite material to be later used in forming structural members. The composite material can be used to form structural members instead of wood, polyvinyl chloride, or metal such as aluminum.

The process of this invention manufactures a pellet composite comprising a thermoplastic polymer and a cellulosic fiber. In making the fiber, about 35 to 50 parts of fiber and about 45 to 70 parts of polymer per each 100 parts of the composite are combined in an extruder. The materials are blended under melt conditions in the extruder under sufficient conditions of temperature and pressure to cause the polymeric composition to mix with the fiber to the extent that the cells of the fiber are disrupted and polymers introduced into the interior volume of the cell causing a substantial increase in the bulk density of the polymer material. The composite mixture contains thermoplastic polymer which has been introduced into the interior volume of the cells such that greater than 50% of the interior volume is occupied by polymer. The hot melt composite is extruded from the composite. We have found that using the process of this invention a pellet is made wherein the ratio of the density of a simple physical mixture of the fiber with undisrupted cells and polymer is made when compared to the density of the pellet with polymer introduced into the interior volume of the cell, the density of the physical mixture divided by the density of the pellet is less than 0.8, preferably less than 0.7.

The preferred composite material of this invention can be made from any polyolefin, polystyrene, polyacrylic or polyester. The most preferred system is polyvinyl chloride and wood fiber wherein the density of the pellet is greater than about 0.6 gram per $cm^3$. Preferably the density of the pellet is greater than 0.7 gram per $cm^3$ and for reasons of improved thermal properties, structural properties, modulus compression strength, etc., the bulk density of the pellet is greater than 0.8 gram per cm$^3$.

We have found that the temperature profile of the extruder is important in developing the improved physical properties of the invention. We have found that having a high initial temperature in the input zone of the extruder is important while reducing the temperature through the extruder zones as the material passes from the input zone through interior zones to the die zone aids in rupturing fiber cell wall and introducing the polymer into the interior volume of the cell. Accordingly, the temperature of the input zone is substantially higher than the melt point of the polymer, the temperature of the interior zones of the extruder are maintained higher than the melt point of the polymer but less than the temperature of the input zone. In a preferred mode of the invention, the temperature profile of the extruder comprises a high input temperature, a step-wise reduction in temperature as the material passes through the interior zones of the extruder but the temperature of the pellet die zone is greater than the interior zone but less than the input zone. In the most preferred pellet compositions of the invention, the polyvinyl chloride occupies greater than 65% of the interior volume of the wood fiber cell and most preferably greater than 70% of the interior volume of the wood fiber cell.

DETAILED DESCRIPTION OF THE PREFERRED EMBODIMENTS

Figure 1:
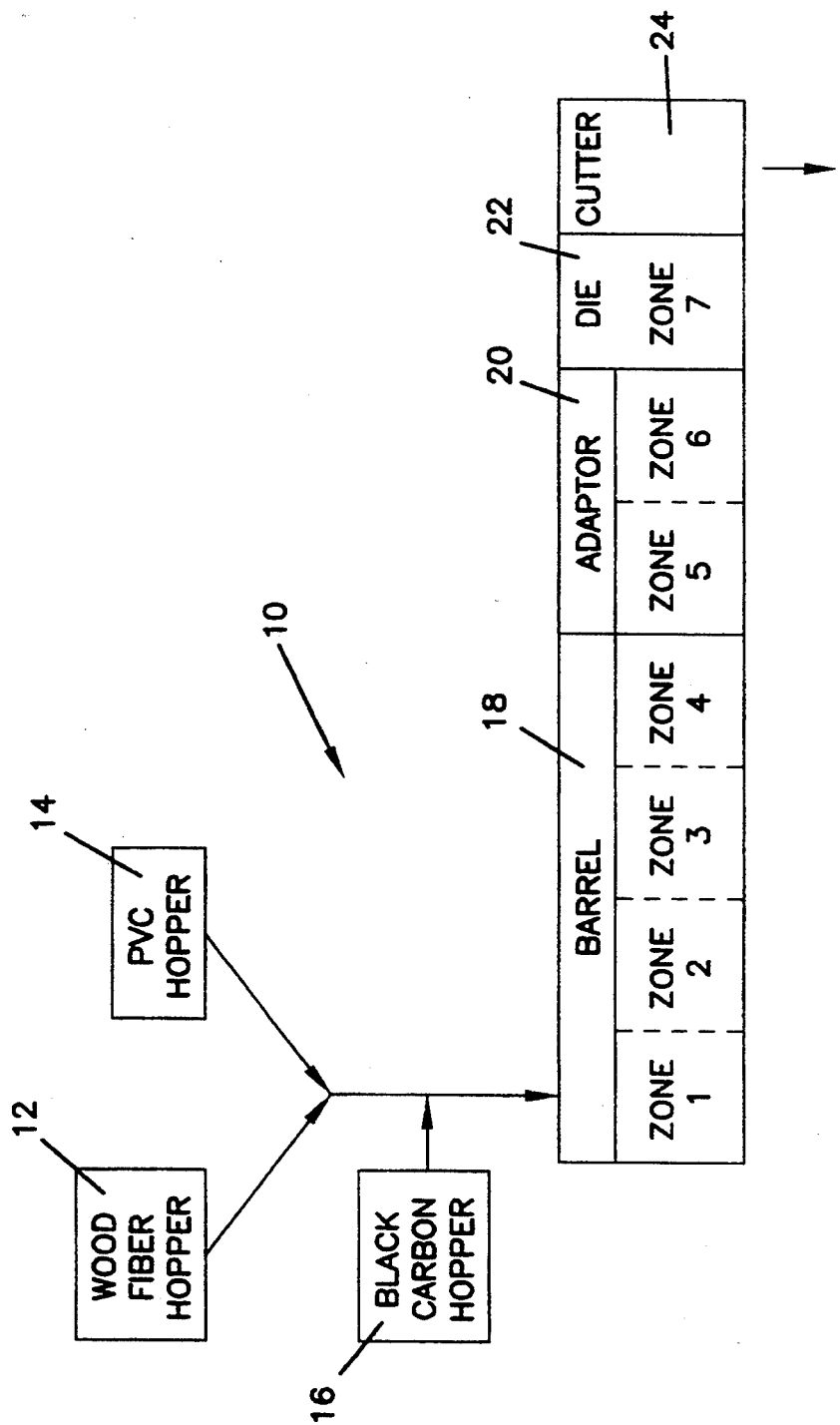
FIG. 1 shows a box diagram of an extruder used to perform the process of the present invention.

This invention relates to a polymer/wood composite pellet process for combining polyvinyl chloride and wood fiber to form a composite pelletized material having a controlled water content. The process generally involves combining and blending polyvinyl chloride and wood fiber by thermoplastic extrusion so that intimate contact between the polyvinyl chloride and wood fiber leads to thorough wetting and filling of the interstitial voids of the wood fiber by the polyvinyl chloride to ensure high quality physical properties in the extruded composite material. The pelletized material can subsequently be remelted and extruded to form structural members for use as a substitute for wood, aluminum or other materials.

Thermoplastic Polymers

The pellet of the invention comprises a composite made by combining a thermoplastic polymer with a cellulosic fiber under conditions of high temperature, pressure and shear. The pellet attains a surprisingly high density when compared to prior art materials resulting in improved physical and structural properties.

Thermoplastic polymers that can be used in the invention comprise well known classes of thermoplastic polymers including polyolefins such as polyethylene, polypropylene, poly(ethylene-copropylene), polyethylene-co-alphaolefin) and others. Polystyrene polymers can be used including polystyrene homopolymers, polystyrene copolymers and terpolymers; polyesters including polyethylene terephthalate, polybutylene terephthalate, etc. and halogenated polymers such as polyvinyl chloride, polyvinylidene chloride and others.

The pellet of the invention uses a cellulosic fiber. The cellulosic fiber commonly comprises fibers having a high aspect ratio made of cells with cellulosic cell walls. During the process of the invention, the cell walls are disrupted and polymers introduced into the interior void volume of the cells under conditions of high temperature and pressure. The cellulosic material can be derived from a variety of sources including hard and soft wood products and by-products, sugar cane, cotton, flax and other known sources of cellulosic materials. The preferred source of cellulosic fiber for this invention comprises wood fiber which can be product or by-product of the manufacture of lumber or other wood products.

Polyvinyl Chloride Homopolymer, Copolymers and Polymeric Alloys

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride resulting in a useful thermoplastic polymer. After polymerization, polyvinyl chloride is commonly combined with thermal stabilizers, lubricants, plasticizers, organic and inorganic pigments, fillers, biocides, processing aids, flame retardants, and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include an acrylonitrile; alpha-olefins such as ethylene, propylene, etc.; chlorinated monomers such as vinylidene dichloride; acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to about 50 mol-%, the balance being vinyl chloride. Polymer blends or polymer alloys can be used in the pellet process of this invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition-dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidine dichloride; polyvinyl chloride/alphamethyl styrene-acrylonitrile copolymer blends; polyvinyl chloride/polyethylene; polyvinyl chloride/-chlorinated polyethylene; and others.

The primary requirement for the substantially thermoplastic polymeric material is that it retain sufficient thermoplastic properties to permit melt blending with wood fiber, permit formation of linear extrudate pellets, and to permit the composition material or pellet to be extruded or injection molded in a thermoplastic process forming a rigid structural member. Polyvinyl chloride homopolymers copolymers and polymer alloys are available from a number of manufacturers including B.F. Goodrich, Vista, Air Products, Occidental Chemicals, etc. Preferred polyvinyl chloride materials are polyvinyl chloride homopolymer having a molecular weight of about 90,000±50,000, most preferably about 88,000±10,000. The preferred polyvinyl chloride has a bulk density of approximately 0.71 gm/cc±0.10 gm/cc.

Wood Fiber

Wood fiber, in terms of abundance and suitability, can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber used in the process of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least 3 mm in length, 1 mm in thickness and commonly have an aspect ratio of at least 1.8. Preferably, the fibers are 1 to 10 mm in length, 0.3 to 1.5 mm in thickness with an aspect ratio between 2 and 7, preferably 2.5 to 6.0.

The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively remove wood from the piece leaving the useful shape. Such milling operations produce substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be prepelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc.; and other waste streams common in the manufacture of wooden doors and windows. The total waste stream content of the wood fiber materials is commonly less than 25 wt-% of the total wood fiber input into the polyvinyl chloride wood fiber product. Of the total waste recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-% of contaminants based on the sawdust. The sawdust preferably has a density of 0.15 gm/cc±0.30 gm/cc.

Extruder

The preferred extruder for performing the process of the present invention is a Cincinnati Milacron 80 (CM-80) Multiscrew Extruder referred to generally by the numeral 10 in FIG. 1. Other extruders such as the Moldovia 70 could also be used, but the CM-80 is the preferred. The CM-80 is a positive displacement pump for the controlled transport of material through a die. Major components of the unit are:

(a) a barrel 18 and two screws to transport, mix, and compress the material;

(b) a heating and cooling system to control the heat needed for processing;

(c) a drive train to power the screws; and (d) a control station for controlling the operation of the extruder, including instruments to monitor the process and indicate possible problems.

Barrel 18 has a meshing, dual, conical taper bore. The combination of barrel taper and screw flight provides proper compression of the composite material. Barrel 18 is manufactured in three sections but has four operational zones.

The larger outside diameter of the screws in the barrel intake area zone 1 allows for good intake of material and provides a large surface area for heat transfer into the material. Between zones 2 and 3 is a vent to allow moisture and other gases to escape from barrel 18. Zone 4 is a metering zone where the material is compressed and metered out to a die 22. Between die 22 and extruder barrel 18 is an adapter 20 having two zones, referred to in FIG. 1 as zones 5 and 6. Die 22 has one zone, referred to in FIG. 1 as zone 7.

The screws each have a hollow core through which heat transfer liquid is circulated. This allows the transfer of unwanted frictional heat from zone 4 back toward zone 1. The four heat zones on barrel 18 are independently controlled by electric heat bands and heat exchangers for accurate stabilization of operational temperatures. Likewise, zones 5 and 6 on adapter 20 and zone 7 on die 22 are independently controlled by heater bands and heat exchangers for accurate temperature control. The temperature of the heat transfer liquid in the screws is also independently controlled. The preferred screws are Cincinnati Milacron Pelletizing Screws, the preferred die is a Cincinnati Pelletizing Die Model GK120.

Heat is applied to the four barrel zones by the electric heat bands. Heat is removed from barrel 18 by circulating oil through coils wound around the barrels at zones 2, 3 and 4. The oil is circulated by a pump unit through a heat exchanger located in the base of the extruder. The barrel cooling system is equipped with flow indicators for a visual check of the cooling performance in each cooling zone. Screw core cooling/heating is accomplished with an independent temperature control unit.

The drive train begins with an infinitely variable speed, constant torque drive motor coupled to a speed reducer. From the speed reducer, the drive train evolves into a two-shaft distribution gear drive. Since the drive shafts are on the center lines of their corresponding tapered screws, it is possible to use large gears for torque transfer and large bearings to take up the axial force (back pressure) generated in the operation of the extruder. In order to achieve consistent quality of product, the speed and motor load of the drive train and the axial load of the thrust bearings are measured.

Wood fiber is introduced into barrel 18 at zone 1 by gravity from a wood fiber hopper 12. The input of wood fiber is preferably metered by a feed screw. The polyvinyl chloride is introduced into zone 1 of barrel 18 by gravity from a polyvinyl chloride hopper 14. The flow of polyvinyl chloride from hopper 14 is preferably metered by a feed screw. From a carbon black hopper 16, carbon black can also be introduced into the wood fiber and polyvinyl chloride input stream. The carbon black is preferably metered into the input stream by a feed screw. The rate of wood fiber, polyvinyl chloride, and carbon black input to barrel 18 is controlled from the control panel.

Positioned at the distal end of die 22 is a cutter 24. Cutter 24 preferably has two oppositely disposed cutting blades. The cutting blades are operably connected to an axle so that with each rotation of the axle, each cutting blade will pass each opening of die 22. The time period between each pass of the blade by a given opening in die 22 should be approximately the same to achieve a constant pellet length.

Pellets

The process of this invention combines the polyvinyl chloride and wood fiber to form a pellet using thermoplastic extrusion. Wood fiber can be introduced into pellet-making process in a number of sizes. We believe that the wood fiber should have a minimum size of length and width of at least 1 mm because wood flour tends to be explosive at certain wood-to-air ratios. Further, wood fiber of appropriate size of a aspect ratio greater than 1 tends to increase the physical properties of the extruded structural member. However, useful structural members can be made with a fiber of very large size. Fibers that are up to 3 cm in length and 0.5 cm in thickness can be used as input to the pellet or linear extrudate manufacturing process. However, particles of this size do not produce highest quality structural members or maximized structural strength. The best appearing product with maximized structural properties are manufactured within a range of particle size as set forth below. Further, large particle wood fiber can be reduced in size by grinding or other similar processes that produce a fiber similar to sawdust having the stated dimensions and aspect ratio. One further advantage of manufacturing sawdust of the desired size is that the material can be pre-dried before introduction into the pellet or linear extrudate manufacturing process. Further, the wood fiber can be pre-pelletized into pellets of wood fiber with small amounts of binder if necessary.

During the pelletizing process for the composite pellet, the polyvinyl chloride and wood fiber are intimately contacted at high temperatures and pressures to insure that the wood fiber and polymeric material are wetted, mixed and extruded in a form such that the polymer material, on a microscopic basis, coats and flows into the pores, cavity, etc., including the interstitial voids of the fibers.

The fibers are preferably substantially oriented by the extrusion process in the extrusion direction. Such substantial orientation causes overlapping of adjacent parallel fibers and polymeric coating of the oriented fibers resulting in a material useful for manufacture of improved structural members with improved physical properties. The degree of orientation is about 20%, preferably 30% above random orientation, which is about 45 to 50%. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member.

Trees when cut, depending on relative humidity and season, can contain from 30 to 300 wt-% water based on fiber content. After rough cutting and finishing into sized lumber, seasoned wood can have a water content of from 20 to 30 wt-% based on fiber content. Kiln-dried sized lumber cut to length can have a water content typically in the range of 8 to 12%, commonly 8 to 10 wt-% based on fiber. Some wood source, such as poplar or aspen, can have increased moisture content while some hard woods can have reduced water content. Because of the variation in water content of wood fiber source and the sensitivity of extrudate to water content, control of water to a level of less than 8 wt-% in the pellet, based on pellet weight, is important.

The pellets made in accordance with the invention formed by extrusion through a die result in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The Cincinnati Pelletizing Die Model GK120 produces a pellet having an approximately circular cross-section.

The preferred pellet is a right circular cylinder, the preferred radius of the cylinder is at least 1.5 mm with a length of at least 1 mm. Preferably, the pellet has a radius of 1 to 5 mm and a length of 1 to 10 mm. Most preferably, the cylinder has a radius of 2.3 to 2.6 mm, a length of 6.4 to 8.5 mm, and a bulk density of about 0.7 to 0.8 gm/mm$^3$.

We have found that the interaction, on a microscopic level, between the polymer mass and the wood fiber is an important element of the invention. We have found that the physical properties of an extruded member are improved when the polymer melt during extrusion of the pellet or linear member thoroughly wets and penetrates the wood fiber particles. The thermoplastic material comprises an exterior continuous organic polymer phase with the wood particle dispersed as a discontinuous phase in the continuous polymer phase. The material during mixing and extrusion obtains an aspect ratio of at least 1.1 and preferably between 2 and 4, optimizes orientation such as at least 20 wt-%, preferably 30% of the fibers are oriented in an extruder direction, and are thoroughly mixed and wetted by the polymer such that all exterior surfaces of the wood fiber are in contact with the polymer material. This means that any pore, crevice, crack, passage way, indentation, etc., is fully filled by thermoplastic material. Such penetration is attained by ensuring that the viscosity of the polymer melt is reduced by operations at elevated temperature and the use of sufficient pressure to force the polymer into the available interstitials voids and surface cracks and crevices of the wood fiber.

During the extrusion process, substantial work is done in providing a uniform dispersion of the wood into the polymer material. Such work produces substantial orientation which, when extruded into a final structural member, permits the orientation of the fibers in the structural member to be increased in the extruder direction resulting in improved structural properties.

The pellet dimensions are selected for both convenience in manufacturing and in optimizing the final properties of the extruded materials. A pellet with dimensions substantially less than the dimensions set forth above is difficult to extrude, pelletize and handle in storage. Pellets larger than the range recited are difficult to introduce into extrusion or injection molding equipment, and are difficult to melt and form into a finished structural member.

Extrusion Process

By the process of the present invention, the polymer and wood fiber are intimately mixed by high shear mixing components with recycled material to form a polymer wood composite wherein the polymer mixture comprises a continuous organic phase and the wood fiber with the recycled materials forms a discontinuous phase suspended or dispersed throughout the polymer phase. The manufacture of the dispersed fiber phase within a continuous polymer phase requires substantial mechanical input. Such input can be achieved using a variety of mixing means including, preferably, extruder mechanisms wherein the materials are mixed under conditions of high shear until the appropriate degree of wetting and intimate contact is achieved. After the materials are fully mixed, the moisture content can be controlled at a moisture removal station. The heated composite is exposed to atmospheric pressure or reduced pressure at elevated temperature for a sufficient period of time to remove moisture resulting in a final moisture content of about 8 wt-% or less. Lastly, the polymer fiber is aligned and extruded into a useful form.

The materials fed to the extruder can comprise from about 30 to 50 wt-% of sawdust including recycled impurity along with from about 50 to 70 wt-% of polyvinyl chloride polymer compositions. Preferably, about 35 to 45 wt-% wood fiber or sawdust is combined with 65 to 55 wt-% polyvinyl chloride homopolymer. When using the CM-80, the preferred feed fate is approximately 600 lbs/hr polyvinyl chloride composition and approximately 400 lbs/hr wood fiber.

The polyvinyl chloride feed is commonly in a small particulate size which can take the form of flake, pellet, powder, etc. Any polymer form can be used such that the polymer can be dry mixed with the sawdust to result in a substantially uniform pre-mix. The wood fiber or sawdust input can be derived from a number of plant locations including the sawdust resulting from rip or cross-grain sawing, milling of wood products, or the intentional commuting or fiber manufacture from waste wood scrap. Such materials can be used directly from the operations resulting in the wood fiber by-product or the by-products can be blended to form a blended product. Further, any wood fiber material alone, or in combination with other wood fiber materials, can be blended with waste stream by-product from the manufacturer of wood windows, as discussed above. The wood fiber or sawdust can be combined with other fibers and recycled in commonly available particulate handling equipment.

Polymer and wood fiber are then dry blended in appropriate proportions prior to introduction into blending equipment. Such blending steps can occur in separate powder handling equipment or the polymer fiber streams can be simultaneously introduced into the mixing station at appropriate feed ratios to ensure appropriate product composition. The later method is preferred when using the CM-80 extruder. Mechanical mixing of the polymer and wood begins in zone 1 of barrel 18. In a preferred mode, the wood fiber is placed in hopper 12 and the input rate to barrel 18 is controlled by a feed screw. The polymer is introduced into hopper 14 and the input rate to barrel 18 is controlled by a feed screw. The pelletizing screws preferably rotate at 35 rpm±5 rpm.

Each zone of the CM-80 extruder 10, adaptor 20, die 22, and screw oil has a desired heat profile resulting in a useful product. The following table shows the preferred operating temperatures of zones 1-7 and the screw oil temperature.

| Zone | Temperature |
| --- | --- |
| 1 | 235° C. ± 10° C. |
| 2 | 235° C. ± 10° C. |
| 3 | 235° C. ± 10° C. |
| 4 | 195° C. ± 10° C. |
| 5 | 180° C. ± 10° C. |
| 6 | 185° C. ± 10° C. |
| 7 | 190° C. ± 10° C. |
| Screw Oil | 190° C. ± 10° C. |

The normal barrel zone and screw oil temperatures for extrusion of polyvinyl chloride alone are 170° C. and 175° C., respectively. We have discovered that higher temperatures are required to achieve the desired physical characteristics of the composite material. We believe that the higher temperatures are necessary in order to remove the moisture from the wood fiber and to fill the interstitial voids of the wood fiber with polyvinyl chloride.

As the material flows through zone 1, the polyvinyl chloride begins to melt and is blended with the wood fiber by the CM pelletizing screws. In zone 2, the polyvinyl chloride is melted and further blended with the wood fiber. Between zones 2 and 3, moisture escaping from the wood fiber is vented from barrel 18. In zones 3 and 4, more blending and compaction of the material is accomplished resulting in the penetration of polyvinyl chloride into the surface pores, cracks and fissures of the wood fiber and into the interstitial voids within the wood fiber.

Once the material leaves zone 4, it passes through adaptor 20 and into die 22, wherein the composite material stream is divided into a number of cylindrical streams through the distal end of die 22. The die can contain a circular distribution (6"-8" diameter) of 10 to 500 or more, preferably 20 to 250 orifices, having a cross-sectional shape leading to the production of a regular cylindrical pellet. As the material is extruded from the head, it is cut with a double-ended knife blade at a rotational speed of about 100 to 400 rpm resulting in the desired pellet length.

While the present invention has been described in connection with the preferred embodiment thereof, it will be understood many modifications will be readily apparent to those skilled in the art, and this application is intended to cover any adaptations or variations thereof. It is manifestly intended this invention be limited only by the claims and equivalents thereof.

What is claimed is:

1. A pellet comprising a thermoplastic polymer and cellulosic fiber, the pellet comprising about 35–50 parts of fiber and 45–70 parts of polymer per each 100 parts of composite wherein (i) the fiber length ranges from 1–10 mm and the fiber has an aspect ratio of at least 1.8, (ii) the ratio of the density of the physical mixture of the fiber and the polymer to the density of the pellet is less than 0.8 and (iii) the pellet is a right circular cylinder having a length 1 to 10 mm and a radius of 1 to 5 mm.

2. The pellet of claim 1 wherein the ratio of density of the physical mixture of the fiber and polymer to the density of the pellet is less than 0.5.

3. The pellet of claim 1 wherein the polymer is polyvinyl chloride and the fiber is wood fiber and the pellet has a bulk density greater than 0.6 gram per $cm^3$.

4. The pellet of claim 1 wherein the bulk density of the pellet is greater than 0.7 gram per $cm^3$.

5. The pellet of claim 1 wherein the bulk density of the pellet is greater than 0.8 gram per $cm^3$.

6. The pellet of claim 1 wherein the polymer occupies greater than 65% of the interior volume of the cells of the cellulosic fiber.

7. The pellet of claim 1 wherein the polymer occupies greater than 70% of the interior volume of the cells of the cellulosic fiber.

8. The pellet of claim 1 wherein the fibers are 1–10 millimeters in length, 0.3–1.5 millimeters in thickness having an aspect ratio of between 2 and 7.

9. The pellet of claim 8 wherein the aspect ratio is between 2.5 to 6.

* * * * *